United States Patent [19]

Earle

[11] 4,408,954

[45] Oct. 11, 1983

[54] WINDMILL YAW AND SPEED CONTROLS

[76] Inventor: John L. Earle, P.O. Box 185, Forest Grove, Oreg. 97116

[21] Appl. No.: 287,456

[22] Filed: Jul. 27, 1981

[51] Int. Cl.³ .............................................. F03D 7/04
[52] U.S. Cl. ...................................... 416/9; 416/43; 416/132 B; 416/170 R
[58] Field of Search .............. 416/9, 11, 43 A, 170 A, 416/132 B, 12, 13, 10

[56] References Cited

U.S. PATENT DOCUMENTS

| 1,469,064 | 9/1923 | Zucker | 416/132 B X |
| 1,707,235 | 4/1929 | Sargent | 416/11 |
| 1,767,303 | 6/1930 | Miller | 416/43 A X |
| 2,352,089 | 6/1944 | Fagerlund | 416/9 |
| 2,517,135 | 8/1950 | Rudisill | 416/9 X |
| 2,534,411 | 12/1950 | Bright | 416/170 A X |
| 4,201,514 | 6/1980 | Hüetter | 416/37 |
| 4,204,126 | 5/1980 | Diggs | 416/170 A X |
| 4,219,308 | 8/1980 | Bottrell | 416/43 A |
| 4,297,076 | 10/1981 | Donham et al. | 416/37 |
| 4,298,313 | 11/1981 | Hohenemser | 416/11 X |

FOREIGN PATENT DOCUMENTS

| 837230 | 4/1952 | Fed. Rep. of Germany | 416/132 B |
| 1077160 | 3/1960 | Fed. Rep. of Germany | 416/51 A |
| 544359 | 9/1922 | France | 416/170 A |
| 621389 | 5/1927 | France | 416/170 A |
| 937903 | 8/1948 | France | 416/44 A |
| 2288877 | 5/1976 | France | 416/132 B |

Primary Examiner—Everette A. Powell, Jr.
Attorney, Agent, or Firm—James Creighton Wray

[57] ABSTRACT

A yaw control device automatically aligns a windmill. A spur gear displaces a motor-driven worm gear mounted between balanced springs when an external turning moment is applied to the windmill. Displacement of the worm gear moves an actuator arm positioned between switches in the motor power supply circuit, closing one of the switches and thereby activating the motor to drive the spur gear in opposition to the turning moment. An idler gear can be operatively positioned between the spur and worm gears. The worm gear is mounted on the rotatable shaft of a bracket pivotally connected to the spur or idler gear axis or is mounted on splined shaft rotatably supported by fixed bearings. The actuator arm is rigidly connected to the worm gear bracket or is pivotally mounted adjacent the worm gear. In an alternative embodiment, the worm gear is connected to the windmill for movement therewith about a fixed spur gear. In a further alternative embodiment, a torque sensor in the drive shaft of a motor connected through gears to the windmill senses the externally applied turning moment. In still further embodiments, proximity switches and idler pulleys sense slack in a drive belt and control a drive motor in response thereto. A windmill speed control has panels pivotally mounted in the rotor blades. Panel control arms are pivotally connected to control rods biased radially inwardly by springs.

45 Claims, 14 Drawing Figures

WINDMILL YAW AND SPEED CONTROLS

BACKGROUND OF THE INVENTION

This invention relates generally to windmills and more particularly has reference to yaw and speed control devices for horizontal axis windmills.

An upwind horizontal axis windmill has the mill facing into the wind. The mill is pivoted about a vertical axis so that it can be aligned to always face into the wind. However, such a windmill is inherently unstable. The mill blades tend to swing to the downward side unless some means of alignment is provided.

The traditional upwind mill has a long tail sail which puts the center of wind behind the pivot. That produces a force to turn the mill into the wind which is greater than the force produced by the mill rotor to turn the mill away from the wind. A typical example is the water pumping windmill seen throughout the Midwest. It has a vertical axis pivot just behind the mill rotor and a long tail sail boom to provide relatively stable alignment. However, tail boom sails become unwieldly and unsightly on large windmills and are thus undesirable.

A technique commonly used in modern windmills to overcome that problem is to abandon the upwind approach and make the windmill a downwind mill by letting the mill blow around to the downwind side. Such mills usually have a thin tower which the wind can easily blow through to strike the lower rotor blades.

However, upwind mills are more desirable because they are more efficient. A technique used in modern upwind mills is to servo-control the windmill to align it with the wind. This technique is also used on downwind machines. A separate wind direction sensor is used to drive a servo-system which aligns the mill with sensor. Some wind direction sensors, especially those used on downwind machines, are mounted on the windward side of the mill machinery cap. However, that mounting is impractical for upwind machines because of wind distortion caused by the mill rotor. Hence, upwind mills generally use a sensor mounted a distance from the windmill sufficient to be relatively free from wind distorting effects. However, such a system often has alignment errors caused by variations in wind direction between the windmill site and the site of the wind direction sensor.

Pertinent United States and foreign patents are found in Class 60, Digest 2; Class 290, Subclass 55; Class 318, Subclasses 652, 656, 671 and 673; and Class 416, Subclasses 9, 10, 37, 40, 41, 44, 51, 139 and Digest 2 of the Official classifications of patents in the U.S. Patent and Trademark Office.

Examples of pertinent patents are U.S. Pat. Nos.: 329,914; 390,698; 401,867; 1,633,460; 3,942,026; 2,563,279; 3,032,119; 3,902,702; 4,088,352.

French Pat. No. 2,355,178 is also pertinent.

U.S. Pat. Nos. 329,914; 390,698; 401,867; 1,633,460 and 3,942,026 disclose windmills that are aligned with wind by mechanical means.

U.S. Pat. Nos. 2,563,279; 3,032,119; 3,902,072 and 4,088,352 disclose wind power plants that are aligned by mechanical or electrical means. A wind vane device is used for positional movement.

French Pat. No. 2,355,178 shows an electrical system used in conjunction with a large spur gear turntable.

From the foregoing, it is clear that a need exists for a compact device which can continuously provide accurate alignment of an upwind horizontal axis windmill. The prior art devices have proved unsatisfactory.

Small windmills traditionally are provided with brakes, governors or shutdown devices which crudely regulate rotor speed. Most large windmills use servo-controlled variable pitch mechanisms which adjust the blade angle of attack to keep the speed constant.

Pertinent U.S. and foreign patents are found in Class 416, subclasses 23, 44, 47, 48, 50, 51, 52 and 53 of the Official Classifications of patents in the U.S. Patent and Trademark Office.

Examples of pertinent patents are U.S. Pat. Nos.: 260,096; 438,251; 802,747; 910,701; 965,387; 1,422,602; 1,542,433; 1,633,428; 1,776,211.

U.S. Pat. Nos. 802,747; 965,387 and 1,422,602 illustrate fluid reaction surfaces that are pivotally controlled to regulate rotor speed. The vanes are controlled by control rods and bars.

U.S. Pat. Nos. 260,096; 438,251 and 1,542,433 disclose wind engines with speed control. The movement of vanes is regulated and adjusted by connecting rods.

U.S. Pat. Nos. 910,701; 1,633,428 and 1,776,211 disclose windmills that are speed regulated by pivoting wind vanes. The vanes are connected to control rods which allow for uniform control.

The following patents are also of interest, but are less relevant than those described above: U.S. Pat. Nos.: 244,677; 478,945; 1,648,837; 1,670,099; 1,713,866; 1,826,039; 2,067,542; 3,891,347; 4,111,601.

Although several patents show windmill blades having plural pivotable panels connected to a control rod for simultaneous operation, most use relatively complex governor-controlled linkages to adjust the panels for speed control. The need exists for a non-complex speed control device.

SUMMARY OF THE INVENTION

The present invention overcomes many of the problems which exist in the prior art devices.

The present invention, which is especially useful on larger upwind mills, senses the force trying to turn the mill away from the wind and uses a servo-control to apply a greater force to realign the mill with the wind.

The basic concept of the present invention is to provide yaw sensing and control to a feedback system that drives the upwind mill to a position that exhibits no differential horizontal stress. Stress put on the windmill blade structure about its vertical axis is measured or sensed in a differential way. If there is a turning moment being applied either clockwise or counter-clockwise, this is sensed and a servo is activated to drive the windmill towards the greater yawing force until equilibrium of the differential forces is obtained. The most practical drive means is an electric motor drive. However, a mechanical scheme can also be used.

Several embodiments of the invention are contemplated.

In a large horizontal axis windmill, like an old Dutch mill without a tail, the mill is mounted on a cap that is pivoted on a vertical shaft. In one embodiment of the present invention, a large spur gear is attached to the mill cap. This gear is totally separate from the windmill power train which could go from the rotor through bevel gears to a power shaft running coaxially down the middle, or quite possibly a generator would be rigidly attached to a pivot with the mill cap.

A worm gear engages and holds the spur gear and ultimately determines mill alignment. The worm gear can be driven either clockwise or counter-clockwise as required for alignment.

The worm gear is free to move slightly along its axis against a balanced spring force. In one embodiment, the worm is mounted on a splined shaft having coil springs on both ends to keep the gear centered when perfectly aligned. In another embodiment, the worm is mounted on a bracket pivotally connected to the axis of the spur gear.

When the wind shifts, the mill rotor tries to go downwind and a force is exerted on the worm gear causing it to move and compress one spring and expand the other of the springs. This movement of the worm is sensed by switches or other sensors and this signal is used to turn on a motor to turn the worm until it gets back to the central perfect alignment position.

A purely mechanical embodiment would use the windmill rotor turning as the restoring force. In this embodiment, it is more practical to attach the worm assembly to the rotor cap and rigidly attach the large spur gear to the tower or mill house. The rotor can be geared down and used to turn the worm which rotates with the cap and rotor assembly. Deviation from the central balanced-force position of the worm would engage a clutch or drive shaft at either extreme of its travel which would turn it until back to the central balanced position. The clutch would disconnect when the worm centered.

Refinements can be made in logic and averaging of the direction error signal with electronic equipment or micro-processors for optimum dynamics.

The directional control of the present invention can be applied to any style windmill, but it is especially useful with horizontal axis windmills and for old Dutch style windmills used to generate electricity.

Object of the invention are, therefore, to provide an improved control device for windmills and to provide an improved control device for aligning an upwind windmill with the wind.

Another object of the invention is to provide a windmill alignment device which is compact and which can be mounted inside the windmill tower.

Yet another object of the invention is to provide an alignment device which is highly accurate, which is free from wind distortion effects, and which eliminates alignment errors.

Another object of the invention is to provide yaw control apparatus for a horizontal windmill assembly mounted for angular movement about a vertical axis comprising rotation means connected to the assembly for selectively rotating the assembly about the vertical axis, sensor means connected to the assembly for sensing an externally applied turning moment, and control means connected to the sensor means and rotation means for activating the rotation means when the sensor means senses a turning moment to rotate the assembly in a direction opposite the turning moment.

Another object of the invention is to provide a sensor element which is mounted for transverse movement and which is operatively connected to the windmill assembly for being transversely displaced upon rotation of the assembly about the vertical axis.

Still another object of the invention is to provide a sensor element comprising a worm gear.

Another object of the invention is to provide yaw control apparatus with a drive motor having a rotatable shaft operatively engaging the windmill assembly for drivingly rotating the assembly and a torque sensor connected to the rotatable shaft.

Yet another object of the invention is to provide a yaw control device comprising a drive motor having a drive element connected to a rotatable shaft, a driven element spaced from the drive element and connected to the assembly for angular movement therewith, a drive belt connected to the drive element and driven element, and slack sensors constructed and arranged to sense slack in the drive belt.

The speed control of the present invention can also be applied to any style windmill but, like the direction control, it is especially useful with horizontal axis windmills and for old Dutch style windmills used to generate electricity. Typically, these large windmills have four-blade rotors.

The basic concept of the present invention is to form the blades of several panel sections which are pivoted on their axes. Arms attached to each panel in a blade are linked together with a control rod which is pulled by a spring toward the axis of rotation of the rotor assembly.

Rotation of the rotor assembly produces a centrifugal force which urges the rods radially outwardly, thereby opening the panels to expose vents in the rotor blades. When the rotor speed reaches a predetermined value, the panels are opened to an extent which permits maintenance of that speed. Deviations from the speed are corrected by further opening or closing the panels as a result of changes in the centrifugal force acting on the control rods.

Effective automatic speed control is achieved through the centrifugal alone. However, the control rods can be intelligently controlled by a servo-mechanism for greater speed control.

If desired, opposite blades can be linked together so that no imbalance occurs in the event that one blade did not respond exactly as the opposite blade.

Objects of the invention, are therefore to provide an improved speed control device for windmills.

Another object of the invention is to provide a relatively non-complex speed control device for a windmill.

Still another object of the invention is to provide a windmill with automatic speed control comprising a rotatably mounted rotor assembly having blades extending radially outwardly from the axis of rotation, panel members pivotally mounted in openings formed in said blades, control arms extending outwardly from the panel members and being constructed and arranged to close said panel members when moved toward the axis of rotation and to open said panel members when moved away from the axis of rotation, elastic link means of predetermined elasticity mounted at the axis of rotation and extending radially outwardly therefrom to the control arms for biasing said arms towards said axis, said arms being urged away from the axis of rotation by centrifugal force upon rotation of said rotor assembly, said predetermined elasticity being selected to position the panel members partway between the open and closed position at a desired speed of rotation.

These and other and further objects and features of the invention are apparent in the disclosure which includes the above and below specification and claims and drawings.

DETAILED DESCRIPTION OF THE DRAWINGS

The present invention is adapted for use with a conventional upwind horizontal axis windmill. The mill rotor is conventionally connected to a cap which is fixed atop a vertical shaft rotatably mounted in a windmill tower. The construction of such windmills is well known and forms no part of the present invention. Hence, for purposes of simplicity and clarity, those elements are generally not shown in the drawings.

The present invention is directed to a control device which is mounted on the windmill tower and rotatable cap in any suitable manner.

Figure 1:
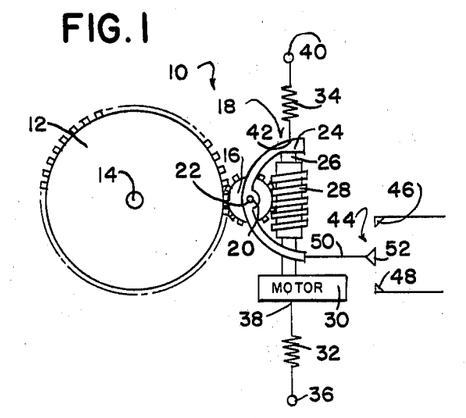
FIG. 1 is a top plan view of a yaw control device embodying the features of the present invention.

Referring to FIG. 1, the preferred yaw control embodying the present invention is generally indicated by the numeral 10.

A spur gear 12 is rotatably mounted in the tower. The gear 12 is connected to the windmill cap for rotation therewith. It is preferred that the gear shaft 14 be the above mentioned vertical shaft which supports the cap, but that is not necessary. The gear 12 can be configured and positioned in any manner desired, the only requirement being that it rotate with the windmill cap.

An idler gear 16 is rotatably mounted on the tower adjacent the spur gear 12. The idler gear 16 meshes with the spur gear 12 for communicating rotational movement between the gears.

A bracket 18 is pivotally mounted with a fixed bearing 20 connected to the idler gear shaft 22. The bracket 18 has outwardly extending arms 24 which rotatably support the ends of a worm gear shaft 26. A worm gear 28 is mounted on the shaft and is configured to meshingly engage the idler gear 16.

A motor 30 is mounted on the bracket 18. The motor 30 is operatively connected to the worm gear shaft 26 to impart rotation to the shaft 26. The power supply circuit for the motor 30 is not shown in FIG. 1 but it is identical to the circuit shown in FIG. 4, which will be described later in detail.

A pair of opposed springs 32 and 34 are positioned adjacent the bracket 18 and motor 30. The spring 32 has an end 36 attached to the windmill tower and an end 38 attached to the motor 30. The spring 34 has an end 40 attached to the tower and an end 42 attached to the bracket arm 24. The springs 32 and 34 are aligned with the worm gear shaft 26 and exert equal but opposite forces on the shaft 26. The springs 32 and 34 thus tend to orient the bracket 18 and worm gear 28 in the central aligned position shown in FIG. 1.

A switching assembly 44 is shown schematically in FIG. 1. The switches 46 and 48 correspond to the switches shown in FIG. 4, which are connected in the power supply circuit for the motor 30. As will be later described, one of the switches is connected in the circuit which powers the motor 30 for clockwise rotation and the other of the switches is connected in the circuit which powers the motor for counter-clockwise rotation. It is contemplated that the switches 46 and 48 will be of the normally open type, but that is not necessary.

A switch actuator 50 is connected to one of the arms 24 of the bracket 18 and is configured to selectively activate one or the other of the switches 46 and 48. The present invention contemplates the use of various actuators 50. The particular actuator used in any given situation is largely a matter of design choice which is limited only by the nature of the switches 46 and 48 and space requirements. For example, the switch assembly 44 could be embodied in a single 3-position toggle switch. The toggle lever would be engaged and shifted by the actuator 50. Alternatively, the switches 46 and 48 could be embodied in separate toggle units spaced slightly apart from each other. The toggle switches would be biased inwardly in a normally open position and would be engaged and urged outwardly into a closed position by the actuator 50. As another alternative, elements 46, 48 and 50 could be single electrical contacts and the power supply lead could be connected to the contact 52. The contact 52 would be moved between the contacts 46 and 48 by the actuator 50 and would engage the contacts 46 and 48 at the ends of its travel to communicate electrical power to those contacts 46 and 48. Other configurations for the switching assembly 44 are also within the scope of the present invention.

If desired, conventional stops can be used to limit the pivotal movement of the bracket 18.

The operation of the embodiment shown in FIG. 1 can now be readily understood.

When the mill rotor is aligned with the wind, the elements of the yaw control 10 are in the positions shown in FIG. 1. Switches 46 and 48 are open and the motor 30 is therefore inactive.

Upon the occurrence of an external disruptive event, such as a shift in the wind direction, a force is applied to the mill rotor tending to rotate the cap in either a clockwise or counter-clockwise direction. The cap rotation is communicated to the spur gear 12. Rotation of the spur gear 12 causes a corresponding rotation of the idler gear 16. The idler gear 16 acts on the worm gear 28 and causes the bracket 18 to pivot about the bearing 20. The worm gear 28 is transversely displaced to an unbalanced position in which one of the springs 32 and 34 is in tension and the other of the springs 32 and 34 is in compression. Sufficient movement of the bracket 18 causes the actuator 50 to close one of the switches 46 and 48. Depending upon which of the switches 46 and 48 is closed, the motor 30 is supplied with power to produce either a clockwise or counter-clockwise rotation of the worm gear shaft 26. The worm gear 28 rotates, causing the idler gear 16, spur gear 12 and windmill cap to rotate. The switches 46 and 48 are arranged in the power supply circuit in a manner to produce a rotation in the cap which is directed oppositely to the externally applied turning moment. Rotation of the cap realigns the mill rotor with the wind.

When the rotor becomes realigned, there is no longer an external turning moment being applied to the cap and spur gear 12. As a result, the springs 32 and 34 urge the bracket 18 to return to the central aligned position shown in FIG. 1. The actuator 50 moves to the position where the switches 46 and 48 are both open. Power to the motor 30 is cut off and rotation of the worm gear 28 ceases.

Figure 2:
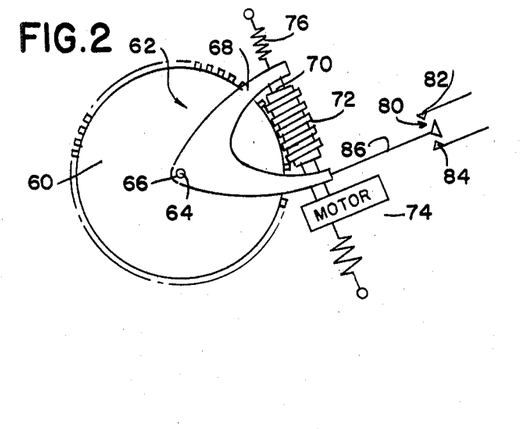
FIG. 2 is a top plan view of an alternative embodiment of the present invention.

The embodiment shown in FIG. 2 is similar to the embodiment shown in FIG. 1, the primary difference being the elimination of the idler gear.

A spur gear 60 is rotatably mounted on the tower and is connected to the windmill cap for rotation therewith. A bracket 62 is pivotally mounted on a fixed bearing 64 connected to the spur gear shaft 66. The bracket has outwardly extending arms 68 which rotatably support the ends of a worm gear shaft 70. A worm gear 72 is mounted on the shaft 70 and is configured to meshingly engage the spur gear 60. The worm gear shaft 70 is rotatably driven by a motor 74 mounted on the bracket 62. Springs 76 and 78 apply opposed balanced forces to the bracket 68 to urge the bracket into the central aligned position as shown in FIG. 2. A switch assembly 80 has switches 82 and 84 connected to the power supply circuit for the motor 74. The switches are operated by an actuator 86 connected to the bracket 68.

The elements shown in FIG. 2 are identical to the corresponding elements shown in FIG. 1.

Operation of the embodiment shown in FIG. 2 is similar to the operation of the embodiment shown in FIG. 1. The only difference is that motion is communicated directly between the spur gear 60 and worm gear 72.

Figure 3:
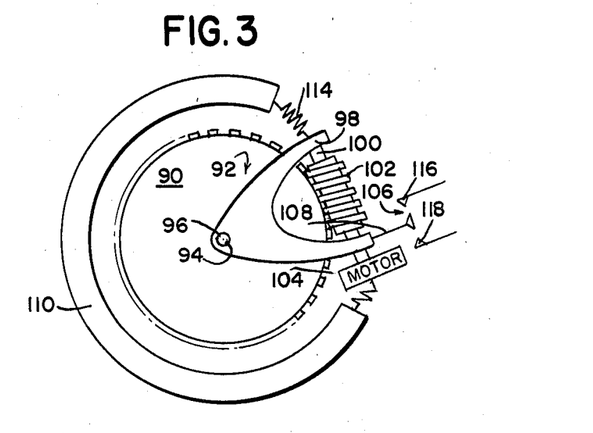
FIG. 3 is a top plan view of another embodiment of the present invention.

A significant difference between the embodiments shown in FIGS. 1 and 2 and the embodiment shown in FIG. 3 is that the latter embodiment uses a spur gear 90 which is fixed to the windmill tower.

A bracket 92 is pivotally mounted on a bearing 94 connected to the spur gear shaft 96. The bracket 92 has arms 98 which rotatably support a worm gear shaft 100. A worm gear 102 is mounted on the shaft 100 and is configured to meshingly engage the spur gear 90. The shaft 100 is driven by a motor 104 mounted on the bracket 92. A switching assembly 106 connected to the power supply circuit for the motor 104 is operated by an actuator 108 connected to the bracket 92.

A ring 110 is connected to the windmill cap for rotation therewith. Springs 112 and 114 extend from the ends of the ring 110 and engage the bracket 92 and motor 104 to urge the bracket 92 into the central aligned orientation shown in FIG. 3.

The switching elements used in the switch assembly 106 are similar to the elements used in the switching assemblies shown in FIGS. 1 and 2. However, the switches 116 and 118 are connected to the ring 110 for rotational movement therewith. Movement of the switches 116 and 118 causes the actuator 108 to selectively open and close the switches 116 and 118 in the manner described with respect to FIGS. 1 and 2.

When a shift in wind direction produces a turning moment in the cap and cap ring 110, the ring 110 is rotated relative to the bracket 92. Sufficient rotation of the ring 110 causes one of the switches 116 and 118 to be closed by the actuator 108. The motor 104 is activated to rotate the worm gear 102 in a clockwise or counter-clockwise direction. That rotation causes the worm gear 102 to travel about the periphery of the fixed spur gear 90. The springs 112 and 114 continuously urge the ring 110 into alignment with the traveling worm gear 102, thereby applying a rotational force to the cap which is opposed to the externally applied turning moment.

When the mill rotor becomes realigned with the wind, the external turning moment is removed from the cap ring 110 and the ring 110 and bracket 92 assume the central aligned orientation shown in FIG. 3. The actuator 108 is positioned to open the switches 116 and 118 and power to the motor 104 is cut off.

Figure 4:
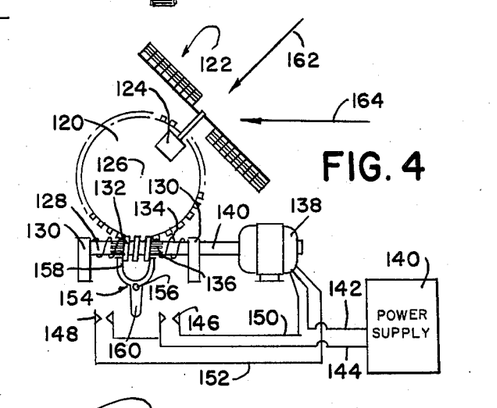
FIG. 4 is a top plan schematic view of still another embodiment of the present invention.

In the embodiment shown in FIG. 4, a spur gear 120 is rotatably mounted on the windmill tower and is connected to the cap for rotation therewith. The mill rotor 122 and a generator 124 powered by the rotor 122 are shown schematically. The generator 124 is connected to the spur gear and cap to permit rotation of the rotor 122 about the vertical cap support shaft 126 which is rotatably mounted in the windmill tower.

A shaft 128 is rotatably supported by a pair of fixed bearings 130 mounted at spaced locations on the windmill tower. A worm gear 132 is mounted on the shaft 128 between a pair of opposed balanced springs 134 which bear against the fixed bearings 130 and worm gear 132. The central portion of the shaft 128 is provided with splines 136 which matingly engage the inner surface of the worm gear 132. The splines 136 permit transverse displacement of the worm gear 132 along the shaft 128 but frictionally engage the worm gear 132 to drivingly rotate the worm gear 132 when the shaft 128 is rotated. If desired, balls can be used in place of the splines.

A motor 138 mounted on the windmill tower has a rotatable drive shaft 140 which is coupled to the shaft 128. Preferably, the motor 138 is a d.c. motor which is powered by a d.c. power supply 140. One of the leads 142 from the power supply 140 is connected directly to the power input terminal of the motor 138. The other lead 144 is connected to normally open switches 146 and 148. A lead 150 is connected to one of the switches 146 and to the motor input terminal which supplies power to the motor for a clockwise rotation of the drive shaft 140. Another lead 152 is connected to the other of the switches 148 and to the motor input terminal which supplies power for counter-clockwise rotation of the drive shaft 140. The leads 142, 144 and 150 and switch 146 thus form a circuit which powers the motor 138 for clockwise rotation when the switch 146 is closed. Leads 142, 144 and 152 and switch 148 form a circuit which powers the motor 138 for counter-clockwise rotation when the switch 148 is closed.

A bracket 154 is mounted on a pivot 156 positioned between the worm gear 132 and switches 146 and 148. The bracket 154 has arms 158 which extend divergently outwardly from the pivot 156 and engage the sides of the worm gear 132. An actuator arm 160 extends from the pivot 156 in a direction opposite the arms 158 and terminates between the switches 146 and 148. Pivotal movement of the bracket 154 causes the actuator arm 160 to close one or the other of the switches 146 and 148. Although the structural details of the actuator arm 160 and switches 146 and 148 are not shown, it is clear that those elements can be constructed and arranged in a manner which is identical to the structures and arrangements discussed above with respect to the actuators and switches shown in FIGS. 1–3.

When the wind blows in the direction indicated by the arrow 162, i.e., when the wind is aligned with the windmill rotor 122, the components of the yaw control device are positioned as shown in the figure. Switches 146 and 148 are open and no power is supplied to the motor 138.

If the wind shifts to the direction indicated by the arrow 164, a force is applied to the rotor 122 which produces a counter-clockwise turning moment in the spur gear 120. The worm 132 shifts to the right and compresses the spring 134 on the right side of the shaft 128. The bracket 154 pivots, causing the actuator arm 60 to move to the left and close the switch 148. Power is supplied to produce counter-clockwise rotation of the motor drive shaft 140. The worm gear is driven in a counter-clockwise direction by the splines 136 and causes the spur gear 120 to rotate in a clockwise direction until the rotor 122 aligns with the wind direction 164. When alignment of the rotor 122 is achieved, the springs 134 urge the worm gear 122 to the central aligned position shown in the figure. The actuator 160 is positioned between the switches 146 and 148 and both switches are thus in their normally open state. Power to the motor 138 is cut off and rotation of the drive shaft 140 ceases.

It is noted that clockwise rotation of the drive shaft 140 refers to the rotation direction when the shaft 140 is viewed from the left end.

Figure 5:
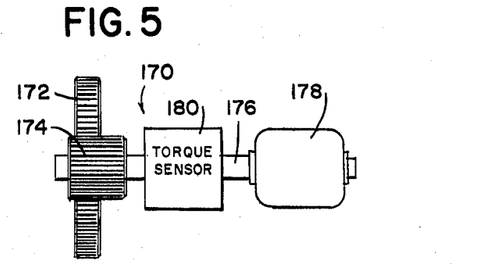
FIG. 5 is a side view of yet another embodiment of the present invention.

Referring to FIG. 5, still another embodiment of the present invention is generally indicated by the numeral 170.

A spur gear 172 is rotatably mounted on the windmill tower and is connected to the cap for rotation therewith. The spur gear meshingly engages a drive gear 174 connected to the end of a shaft 176 rotatably driven by a motor 178. A conventional torque sensor 180 is mounted in line with the drive shaft 176 for sensing the torque in the shaft 176. The motor 178 and torque sensor 180 are connected to control circuitry (not shown) which uses signals from the torque sensor to control the motor in a manner similar to the motor control achieved by the switching assemblies shown in FIGS. 1–4.

A shift in wind direction produces a turning moment in the cap and spur gear 172 which is sensed by the torque sensor 180. The sensor produces a signal which causes the motor 178 to rotate the drive shaft 176 in a direction opposite the turning moment, thereby rotating the cap and realigning the mill rotor with the wind.

If desired, the system 170 can be vertically oriented in the windmill tower and the shaft 176 can be the above mentioned vertical support shaft for the cap.

Figure 6:
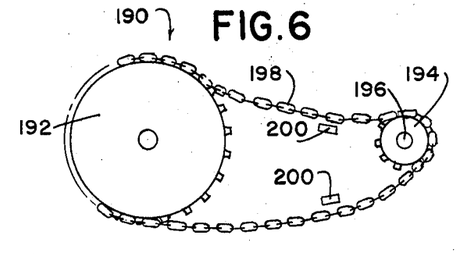
FIG. 6 is a side elevational view of another embodiment of the present invention.

Referring to FIG. 6, yet another embodiment of the invention is indicated generally by the numeral 190.

A spur gear 192 is rotatably mounted in the tower and is operatively connected to the cap for rotation therewith. A drive gear 194 is rotatably mounted on the tower at a location spaced from the spur gear 192. The drive gear shaft 196 is operatively connected to a motor (not shown). A drive belt 198, preferably a chain, loops around the spur gear 192 and drive gear 194 to communicate driving rotation from the drive gear 194 to the spur gear 192.

Sensors 200 are mounted on the tower adjacent the portions of the drive belt 198 between the gears 192 and 194. The sensors are constructed and arranged to sense the stress, droop or sag in the belt 198. In one embodiment, the sensors 200 are proximity switches which change state when the belt 198 is a predetermined distance from the switch 200.

The switches 200 are connected to the power supply circuit for a drive motor in the manner shown in FIG. 4. The drive motor (not shown) is operatively coupled to the drive shaft 196.

Operation of the system 190 can now be readily understood.

When the mill rotor is aligned with the wind, the components are positioned in the manner shown in FIG. 6. A shift in wind direction produces a turning moment in the spur gear 192 which causes the drive belt 198 to move relative to the switches 200. When the belt 198 moves a predetermined distance from the switches 200, the switches 200 change state to provide the motor with power to rotate the drive gear 194 in a direction opposite the turning moment. The drive gear 194 drives the belt 198 which causes the spur gear 192 to rotate in the direction opposite the turning moment, thereby realigning the mill rotor with the wind.

When realignment is achieved, the externally applied turning moment is removed from the spur gear 192 and the drive belt 198 moves to the neutral position shown in the figure with respect to the switches 200. The switches 200 are opened and power to the drive motor is cut off.

Figure 7:
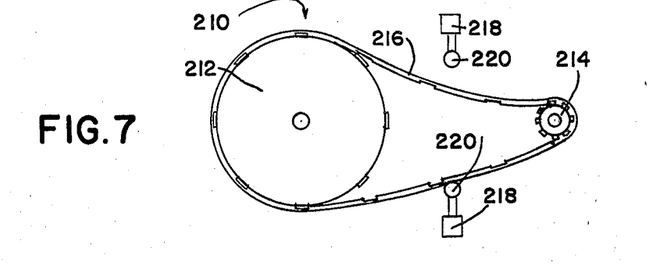
FIG. 7 is a side elevational view of a further embodiment of the present invention.

The system 210 shown in FIG. 7 is similar to the system 190 shown in FIG. 6. Rotatably mounted pulleys 212 and 214 are used instead of the gears 192 and 194 shown in FIG. 6. A cog belt 216 is used in place of the drive chain 198 shown in FIG. 6. However, those elements operate in a manner similar to the corresponding elements shown in FIG. 6.

Sensors 218 are mounted on the windmill tower adjacent the portions of the cog belt 216 between the pulleys 212 and 214. The sensors 218 detect side deflection of the belt 216. In one embodiment, the sensors 218 are provided with idler pulleys 220 which gently push against the belt 216 to sense slack therein.

The pulley 214 is driven by a motor (not shown). The sensors 218 are connected to a motor control system which is similar to that described in FIG. 6 to control operation of the motor in response to the sensed slack in the belt 216.

Figure 11:
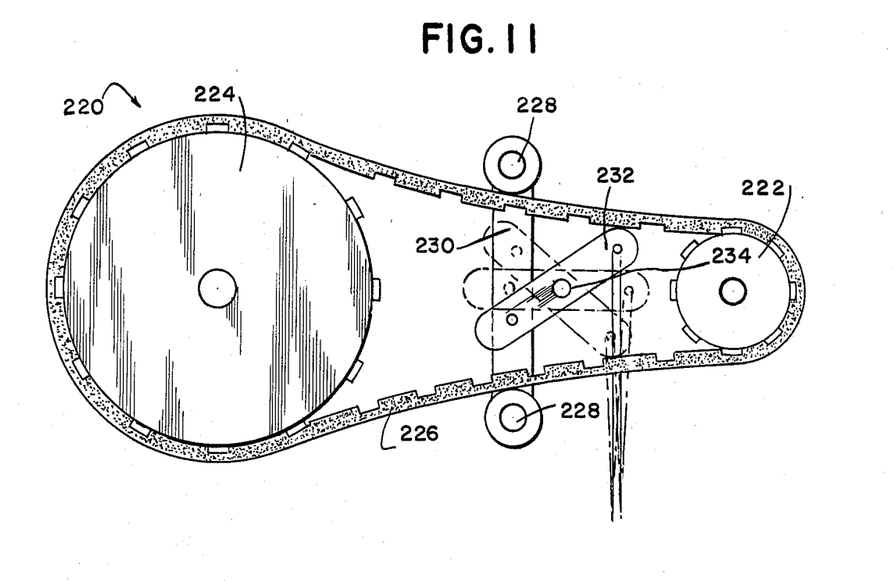
FIG. 11 is a top plan view of another embodiment of the yaw control of the present invention.

The system 220 shown in FIG. 11 is similar to the system 210 shown in FIG. 7. A rotatably mounted pulley 222 acts as a yaw drive gear. A rotatably mounted pulley 224 is operatively connected to the windmill cap for rotation therewith, thus acting as a yaw gear. A cog belt 226 loops around the pulleys 222 and 224 to communicate driving rotation from the yaw drive gear 222 to the yaw gear 224.

Force sensors in the form of idlers 228 are mounted on the windmill tower adjacent the portions of the cog belt 226 between the pulleys 222 and 224. The idlers 228 are linked together positionally by a link 230 to sense differential forces on the cog belt 226.

A rocker arm 232 is mounted on the tower for pivotal movement about a central pivot 234. One end of the arm 232 is pivotally connected to the link 230 and the opposite end of the arm 232 is pivotally connected to an actuator arm 236. Thus, movement of the link 230 caused by differential forces in the cog belt 226 are communicated through the rocker 232 to impart axial translation to the actuator arm 236. The actuator arm 236 is connected to a motor control system which is similar to that described in FIG. 6 to control operation of the motor in response to the differential forces in the cog belt 226. The drive gear 222 is driven by the motor.

Although the preferred drive system for the yaw control of the present invention is the electric motor described above, it is contemplated that any hydraulic, air, spring or weight drive system could be used. All of these alternative systems would derive their energy either directly or indirectly from the rotation of the windmill blades. Only a small portion of the windmill output would be necessary for yaw control.

Figure 12:
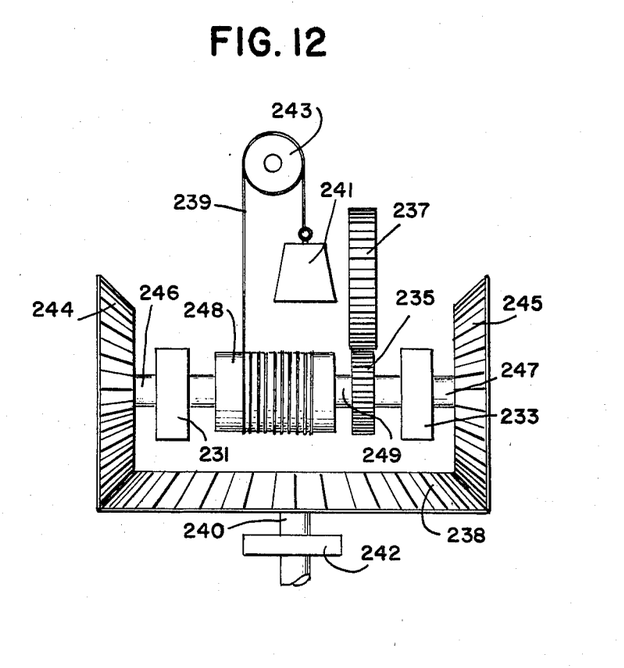
FIG. 12 is a side elevational schematic illustration of a drive system useful with the yaw control of the present invention.

An example of a mechanical drive system is shown in FIG. 12. That system would be particularly useful with the cog belt arrangement shown in FIGS. 7 and 11.

A bevel gear 238 is fixed to the end of a rotatable shaft 240 drivingly connected to the yaw control drive gear. A brake 242 is provided to selectively prevent rotation of the gear 238.

A pair of bevel gears 244 and 245 are fixed to the ends of rotatable shafts 246 and 247 extending perpendicular to the axis of the beveled gear 238. A cable spool 248 is mounted on a shaft 249 which is connected to the shafts 246 and 247 through clutch mechanisms 231 and 233. A gear 235 is fixed to the shaft 249 between the spool 248 and one of the clutches 233. The gear 235 engages a gear 237 which is selectively drivable by the windmill rotor. The gears 235 and 237 are arranged to rotate a spool 248 so as to wind the cable 239 onto the spool. The windup drive gear train is provided with one-way ratchet to allow the brake 242 to be kept on the beveled gear 238 while rewinding the cable 239.

A weight 241 is connected to the end of the cable 239. The cable 239 is supported in the windmill tower by a pulley 243.

When the actuator arm of the yaw control system is in the neutral position, the brake 242 engages the gear 238 and prevents rotation thereof. The windup drive gear 237 is operatively driven by the windmill rotor to wind the cable 239 onto the spool 248 and thereby elevate the weight 241.

When the actuator arm is displaced from the neutral position, the brake 242 is released and one of the clutches 231 and 233 is engaged. Clutch 231 provides counterclockwise rotation to the bevel gear 238 and clutch 233 provides clockwise rotation to the bevel gear 238. The weight 241 descends under the force of gravity, thereby unwinding cable 239 from the spool 248 and imparting rotation to the shaft 249. That rotation is communicated to either the gear 244 or the gear 245 through its respective clutch 231 and 233 depending upon which of the clutches is engaged. The clockwise clutch 233 is engaged when the actuator arm is translated in a direction indicative of counterclockwise rotational moment being applied to the windmill. The counterclockwise clutch 231 is engaged when the actuator arm is translated in the opposite direction indicating a clockwise rotational moment being applied to the windmill.

It is readily apparent that the fundamental yaw control concepts disclosed herein can be manifest in numerous additional embodiments without departing from the scope of the present invention.

Although the present invention is preferably used to control the alignment of windmills, it is readily apparent that the invention can be used to control the alignment of any device which can be misaligned by an externally applied turning moment.

Figures 8, 9A, 9B, 9C, 10:
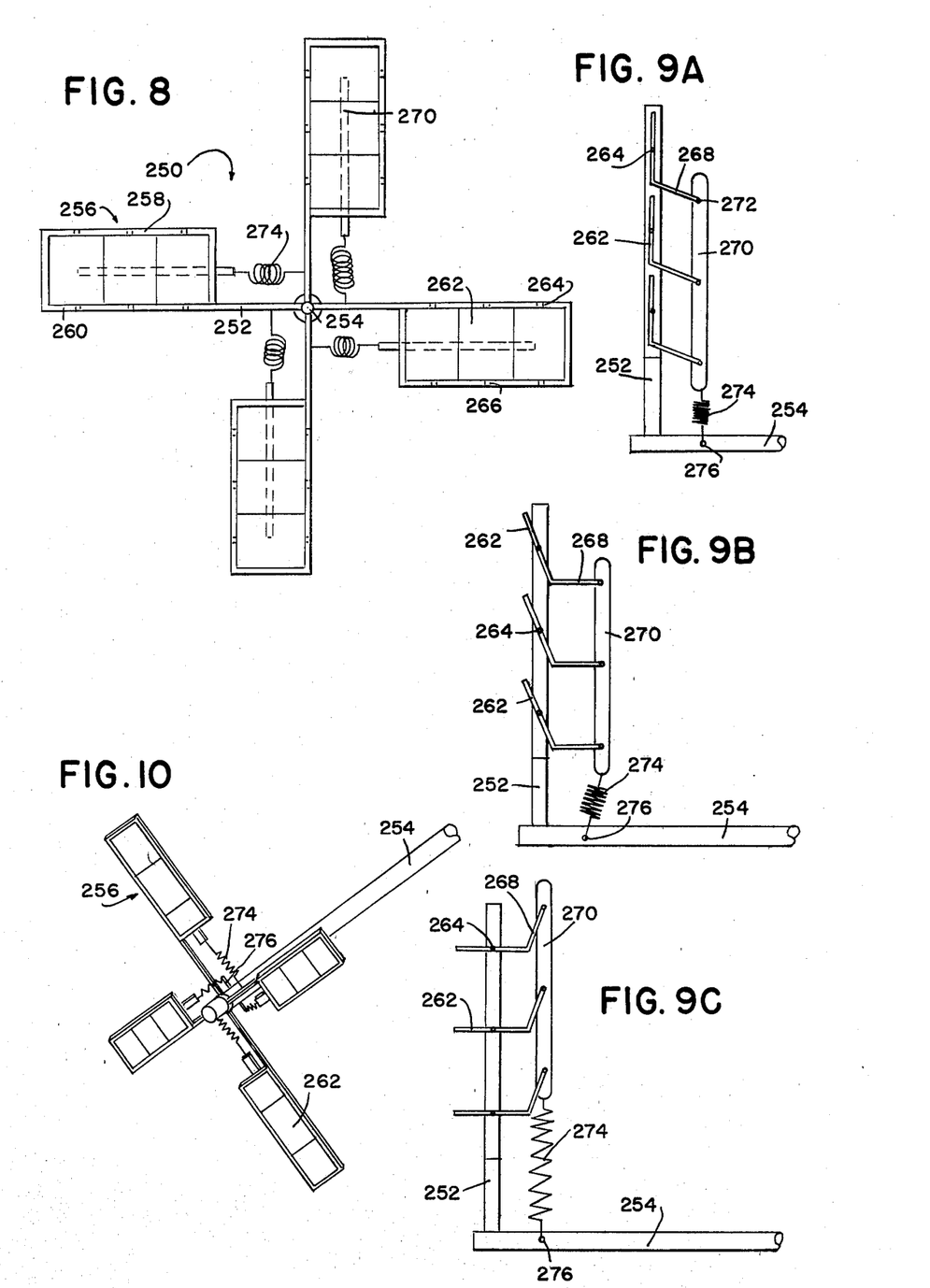
FIG. 8 is a front elevational view of a windmill rotor with speed control embodying features of the present invention.
FIGS. 9A–9C are side elevational views showing one of the blades of FIG. 8 during underspeed, regulating speed and overspeed conditions.
FIG. 10 is a perspective view of the apparatus shown in FIG. 8.

A windmill rotor with speed control embodying features of the present invention is indicated generally by the number 250 in FIG. 8.

Four mutually perpendicular support arms 252 extend radially outwardly from a main rotation shaft 254 mounted on a windmill tower (not shown). In one embodiment, the support arms 252 are rigidly connected to the shaft 254 which is rotatably mounted on the windmill tower. In another embodiment, the support arms 252 are rotatably connected to the main shaft 254, for example by a bearing connection, and the main shaft is rigidly connected to the windmill tower.

Rotor blades 256 are mounted on the outward ends of the support arms 252. A typical Dutch-style windmill is provided with four support arms 252 and four rotor blades 256 as shown in FIG. 8. However, it is readily apparent that the number of support arms 252 and rotor blades 256 can be varied without departing from the present invention.

In the preferred embodiment, the rotor blades 256 have a peripheral frame structure 258 which defines a central rectangular opening 260. Three identical rectangular panels 262 are arranged longitudinally in the openings 260 so that they completely close the opening when they are aligned with the frame members 258. It is contemplated, however, that the shape of the rotor blades and openings therein, as well as the number and shape of the panels, can be varied. For example, the blades could be formed with an inwardly tapering or outwardly tapering shape. The blades could be provided with a plurality of discreet openings and one or more panels could be mounted in each of those openings. The blades could also be provided with openings which are not closed by panels or other means. It is also contemplated that each blade could be provided with only one panel.

The panels 262 are pivotally mounted in the frame 258. In the preferred embodiment, the panels 262 are provided with a pair of transversely extending shafts 264 mounted centrally on opposite sides of the panel. The shafts 264 are rotatably supported by bearing openings formed in the frame members 258. Alternatively, the panels 262 are provided with bearing openings which rotatably receive shafts rigidly connected to the frame members. In further alternative embodiments, the panels are mounted for angular movement about the axis parallel to the frame members or are mounted for angular movement about an axis which is offset from the center of the panels.

As best shown in FIGS. 9A–9C, each of the panels is provided with an arm 268 which extends outwardly at an oblique angle from the inward edges of the panels 262. The arms 268 in a blade 256 are interconnected by a control rod 270. The connection 272 between the arms 268 and the control rods 270 are bearing connections or any other connection which will permit relative pivotal movement between the arms 268 and the control rods 270.

The inward ends of the control rods 270 are connected to springs 274. As best shown in FIG. 10, the springs 274 extend radially inwardly from the control rods 270 and are connected to radially extending arms 276 mounted on the main shaft 254. Where the shaft 254 is rotatably mounted on the windmill tower and is rigidly connected to the support arms 252, the arms 276 are rigidly connected to the shaft 254. On the other hand, where the shaft 254 is rigidly connected to the windmill tower and is rotatably connected to the support arms 252, the arms 276 are formed on a collar (not shown), which is rotatably mounted on the shaft 254 between axially spaced stops. The particular means used to mount the springs 274 can be varied without departing from the present invention as long as the springs are free to rotate with the rotor blades 256.

The operation of the invention can now be readily understood.

The position of the panels 262 at three speed conditions are shown in FIGS. 9A–9C.

FIG. 9B shows the position of the panels at regulating speed, i.e., the desired speed of rotation of the windmill rotor. As can be seen in the figure, the control rod 270 is urged radially outwardly by the centrifugal force produced by rotation of the rotor assembly. Movement of the control rod 270 partially opens the panels 262, thereby allowing a portion of the wind to pass through the rotor blades 256.

When the speed of rotation of the rotor assembly falls below the desired value, centrifugal force is reduced and the spring 274 urges the control rod 270 radially inwardly. The inward movement of the rod 270 closes the panels 262 so that less wind passes through the rotor blades 256. The additional wind impinging on the blades 256 acts to increase the rotation speed of the rotor assembly. FIG. 9A shows the fully closed position of the panels 262 when the rotor assembly is stopped.

When the rotation speed of the rotor assembly rises above the regulating speed, centrifugal force is increased and the control rod 270 is urged further outwardly. The outward movement of the control rod 270 further opens the panels 262 to allow more wind to pass through the rotor blades 256. A reduction in the amount of wind impinging in the rotor blades 256 causes a decrease in the rotation speed of the rotor assembly. FIG. 9C shows the fully opened position of the panels 262 when the rotor assembly is rotating at a speed well above the regulating speed.

The panels 262 assume open and closed positions intermediate those shown in FIGS. 9A–9C to correct small variations from regulating speed.

The springs 274 have an elasticity which is sufficient to balance the centrifugal force and hold the panels 262 in the partially opened position when the rotor assembly is at regulating speed. It is preferred that the panels 262 be opened midway at regulating speed as shown in FIG. 9B, but that is not essential.

While the invention has been described with reference to specific embodiments, the exact nature and scope of the invention is defined in the following claims.

I claim:

1. Yaw control apparatus for a horizontal windmill assembly mounted for angular movement about a vertical axis comprising
    rotation means connected to the assembly for selectively rotating the assembly about the vertical axis,
    sensor means connected to the assembly for sensing externally induced angular movement of the assembly about the vertical axis, and
    control means connected to the sensor means and rotation means for activating the rotation means when the sensor means senses said angular movement to rotate the assembly in a direction opposite the angular movement.

2. The apparatus of claim 1 wherein the sensor means comprises a sensor element mounted for transverse movement and operatively connected to the assembly for being transversely displaced upon rotation of the assembly about the vertical axis.

3. The apparatus of claim 2 wherein the sensor element is mounted between balanced springs opposing said transverse displacement.

4. The apparatus of claim 2 wherein the sensor element comprises a worm gear.

5. The apparatus of claim 4 wherein a spur gear is connected to the assembly for angular movement upon rotation of the assembly, said spur gear meshing with said worm gear for transversely displacing said worm gear upon angular movement of the spur gear.

6. The apparatus of claim 5 wherein a bracket is mounted for angular movement about the axis of said spur gear, said worm gear being mounted on said bracket for angular displacement about said spur gear axis upon rotation of the assembly.

7. The apparatus of claim 6 wherein the bracket has spaced radially extending arms and a shaft extending between the arms and supported thereby, said worm gear being mounted on said shaft.

8. The apparatus of claim 7 wherein springs extend laterally outwardly from said arms and apply balanced opposed forces to said bracket.

9. The apparatus of claim 4 wherein a spur gear is connected to the assembly for angular movement upon rotation of the assembly, an idler gear rotatably mounted between said spur gear and said worm gear meshingly engages said spur gear and worm gear for transversely displacing said worm gear upon angular movement of the spur gear.

10. The apparatus of claim 9 wherein a bracket is mounted for angular movement about the axis of said idler gear, said worm gear being mounted on said bracket for angular displacement about said idler gear axis upon rotation of the assembly.

11. The apparatus of claim 10 wherein the bracket has spaced radially extending arms and a shaft extending between the arms and supported thereby, said worm gear being mounted on said shaft.

12. The apparatus of claim 11 wherein springs extend laterally outwardly from said arms and apply balanced opposed forces to said bracket.

13. The apparatus of claim 1 wherein the sensor means comprises a rotatable element operatively connected to the assembly for being rotatably displaced upon rotation of the assembly about the vertical axis.

14. The apparatus of claim 13 further comprising
    a fixed spur gear, and
    a worm gear mounted between balanced opposed springs and meshingly engaging said spur gear for angular movement about the axis of the spur gear, said springs extending laterally outwardly from said worm gear to engage said rotatable element.

15. The apparatus of claim 14 wherein a bracket is mounted for angular movement about the spur gear axis, said worm gear being mounted on said bracket.

16. The apparatus of claim 15 wherein the bracket has spaced radially extending arms and a shaft extending between the arms and supported thereby, said worm gear being mounted on said shaft.

17. The apparatus of claim 1 wherein the rotation means comprises a drive motor operatively connected to the assembly for rotating said assembly.

18. The apparatus of claim 5 wherein the rotation means comprises a drive motor operatively connected to the worm gear for rotating the worm gear, said rotating worm gear drivingly rotating said spur gear thereby rotating said assembly.

19. The apparatus of claim 7 wherein the rotation means comprises a drive motor operatively connected to the shaft for rotating the shaft, said shaft being drivingly connected to the worm gear for imparting rotation of the worm gear, said rotating worm gear drivingly rotating said spur gear and thereby rotating said assembly.

20. The apparatus of claim 19 wherein the drive motor is mounted for angular movement with said bracket.

21. The apparatus of claim 9 wherein the rotation means comprises a drive motor operatively connected to the worm gear for rotating the worm gear, said rotating worm gear drivingly rotating said idler gear and thereby drivingly rotating said spur gear and said assembly.

22. The apparatus of claim 11 wherein the rotation means comprises a drive motor operatively connected to the shaft for rotating the shaft, said shaft being drivingly connected to the worm gear for imparting rotation to the worm gear, said rotating worm gear drivingly rotating said idler gear and thereby drivingly rotating said spur gear and said assembly.

23. The apparatus of claim 22 wherein the drive motor is mounted for angular movement with said bracket.

24. The apparatus of claim 14 wherein the rotation means comprises a drive motor operatively connected to the worm gear for rotating the worm gear and thereby angularly moving the worm gear about the spur gear axis, said springs communicating movement of said worm gear to said rotatable element thereby rotating said assembly.

25. The apparatus of claim 16 wherein the rotation means comprises a drive motor operatively connected to the shaft for rotating the shaft, said shaft being drivingly connected to the worm gear for imparting rotation to the worm gear and thereby angularly moving the worm gear about the spur gear axis, said springs communicating movement of said worm gear to said rotatable element thereby said assembly.

26. The apparatus of claim 25 wherein the drive motor is mounted for angular movement with said bracket.

27. The apparatus of claim 1 wherein the control means comprises plural switches, the rotation means being activated to rotate the assembly in a clockwise direction upon closure of a first switch and being activated to rotate the assembly in a counter-clockwise direction upon closure of a second switch.

28. The apparatus of claim 2 wherein the control means comprises plural switches, the rotation means being activated to rotate the assembly in a clockwise direction upon closure of a first switch and being activated to rotate the assembly in a counter-clockwise direction upon closure of a second switch, and a switch actuator element connected to the sensor element for transverse movement therewith, said actuator element being configured to close said first switch upon transverse displacement to a first location and to close said second switch upon transverse displacement to a second location opposite the first location.

29. The apparatus of claim 3 wherein the control means comprises plural switches, the rotation means being activated to rotate the assembly in a clockwise direction upon closure of a first switch and being activated to rotate the assembly in a counter-clockwise direction upon closure of a second switch and being unactuated when the first and second switches are open, and a switch actuator element connected to the sensor element for transverse movement therewith, said actuator element being configured to close said first switch on transverse displacement to a first location and to close said second switch upon transverse displacement to a second location opposite the first location and to open said switches when said springs urge the actuator element to a location between said first and second locations.

30. The apparatus of claims 6 or 10 or 15 wherein the control means comprises plural switches, the rotation means being activated to rotate the assembly in a clockwise direction upon closure of a first switch and being activated to rotate the assembly in a counter-clockwise direction upon closure of a second switch, and a switch actuator element is connected to the bracket for movement therewith, said actuator element being configured to close said first switch upon movement to a first location and to close said second switch upon movement to a second location opposite the first location.

31. The apparatus of claim 29 wherein the plural switches comprise two transversely spaced normally-open switches, and the switch actuator element comprises an arm extending outwardly from the sensor element to a location between said normally-open switches, said actuator element engaging and closing one of said switches upon transverse displacement to said first location and engaging and closing the other of said switches upon transverse displacement to said second location.

32. The apparatus of claim 1 wherein the rotation means comprises a drive motor having a rotatable shaft operatively engaging the assembly for drivingly rotating the assembly, and the sensor means comprises a torque sensor connected to the rotatable shaft.

33. The apparatus of claim 32 wherein a spur gear is connected to the assembly for angular movement therewith, and a drive gear connected to the rotatable shaft meshingly engages with the spur gear for communicating angular movement between the spur gear and rotatable shaft.

34. The apparatus of claim 1 wherein
the rotation means comprises a drive belt having a drive element connected to a rotatable shaft, a driven element spaced from the drive element and connected to the assembly for angular movement therewith, and a drive belt connected to the drive element and driven element, and
the sensor means comprises slack sensors constructed and arranged to sense slack in the drive belt.

35. The apparatus of claim 34 wherein the slack sensors comprise proximity switches positioned adjacent the belt between the drive element and driven element, said switches being activated when the belt is located a predetermined distance from the switches.

36. The apparatus of claim 35 wherein the drive element comprises a drive gear, the driven element comprises a spur gear, and the drive belt comprises a chain.

37. The apparatus of claim 34 wherein the slack sensors comprise switches operatively connected to displaceable idler pulleys which contact the belt between the drive element and driven element, said switches being activated when the belt displaces the pulleys to predetermined positions.

38. The apparatus of claim 37 wherein the drive element and driven element comprise pulleys and the belt comprise a cog belt.

39. The apparatus of claim 5 wherein a rotatable shaft is mounted adjacent the spur gear, said worm gear is mounted on said shaft between said balanced springs and is configured to be drivingly engaged by said splines upon rotation of the shaft and to be axially displaced along the shaft upon rotation of the spur gear.

40. The apparatus of claim 39 wherein the rotation means comprises the drive motor operatively connected to the shaft for rotating the shaft.

41. The apparatus of claim 39 wherein the switch means comprises two transversely spaced normally-open switches, and a pivotally mounted switch actuator element having an actuator arm extending outwardly from the pivot to a location between said normally-open switches and a pair of transversely spaced engagement arms extending outwardly from the pivot opposite the actuator arm and engaging opposite sides of the worm gear for transverse movement therewith, said actuator arm engaging and closing one of said switches upon axial displacement of said worm gear to a first location and engaging and closing the other of said switches upon axial displacement of the worm gear to a second location opposite the first location.

42. The apparatus of claim 37 wherein a pair of idler pulleys are positioned adjacent opposite outside surfaces of the belt, a link arm is connected to the pulleys, a rocker arm is pivotally connected to the link arm between the pulleys, and an actuator arm is connected to an end of the rocker arm opposite the link arm, axial movement of the link arm thereby imparting opposite axial movement to the actuator arm.

43. The apparatus of claim 1 wherein the rotation means comprises a pulley mounted at an elevated position, a cable passing over the pulley, a weight connected to one end of the cable, a rotatable spool configured to receive the opposite end of the cable, said spool being operatively connected to the assembly for rotating the assembly when the weight descends under the force of gravity.

44. The apparatus of claim 43 wherein the spool is mounted on a shaft extending between a pair of spaced gears, clutch means are provided between the spool and each of the gears for selectively communicating rotational movement of the spool to the gears, a drive gear is mounted on an axis perpendicular to the axis of the gears and meshingly engages the gears, engagement of one of the clutch means imparting counterclockwise rotation to the drive gear and engagement of the other of the clutch means imparting clockwise rotation to the drive gear.

45. The apparatus of claim 43 wherein a gear train is operatively connected to the windmill assembly for receiving motive rotational forces therefrom and is operatively connected to the spool for communicating rotational forces to the spool to wind the cable onto the spool.

* * * * *